United States Patent
Fellenstein et al.

(10) Patent No.: US 8,214,478 B2
(45) Date of Patent: *Jul. 3, 2012

(54) PATH SATURATION FOR COMPUTER STORAGE PERFORMANCE ANALYSIS

(75) Inventors: Craig William Fellenstein, Brookfield, CT (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 603 days.

This patent is subject to a terminal disclaimer.

(21) Appl. No.: 12/337,607

(22) Filed: Dec. 17, 2008

(65) Prior Publication Data
US 2009/0100294 A1 Apr. 16, 2009

Related U.S. Application Data

(63) Continuation of application No. 10/886,961, filed on Jul. 8, 2004, now Pat. No. 7,480,717.

(51) Int. Cl.
*G06F 15/173* (2006.01)
*G06F 11/00* (2006.01)
(52) U.S. Cl. ............. 709/223; 709/224; 714/25; 714/46
(58) Field of Classification Search .................. 709/223, 709/224; 714/25, 46
See application file for complete search history.

(56) References Cited

U.S. PATENT DOCUMENTS

| | | | |
|---|---|---|---|
| 6,249,886 B1 * | 6/2001 | Kalkunte | 714/47.3 |
| 6,278,959 B1 | 8/2001 | Alferness | |
| 6,282,569 B1 * | 8/2001 | Wallis et al. | 709/224 |
| 2002/0013832 A1 * | 1/2002 | Hubbard | 709/220 |
| 2002/0103876 A1 | 8/2002 | Chatani et al. | |
| 2003/0014208 A1 | 1/2003 | Glynn et al. | |
| 2003/0046396 A1 | 3/2003 | Richter et al. | |
| 2003/0061324 A1 | 3/2003 | Atherton et al. | |
| 2003/0158930 A1 | 8/2003 | McBride | |
| 2003/0193895 A1 * | 10/2003 | Engwer et al. | 370/241 |
| 2004/0015761 A1 | 1/2004 | Klotz et al. | |
| 2004/0044744 A1 | 3/2004 | Grosner et al. | |
| 2004/0098230 A1 | 5/2004 | Richard et al. | |
| 2005/0154940 A1 | 7/2005 | Umeda | |

* cited by examiner

*Primary Examiner* — Ranodhi Serrao
(74) *Attorney, Agent, or Firm* — Yee & Associates, P.C.; John R. Pivnichny

(57) ABSTRACT

A system and method for path saturation in a storage area network so that the throughput of the storage area network may be determined. The system and method includes a software utility suite that uses either a system administration scripting language, e.g., Perl or Korn shell, or by compiled or machine language software. The software utility suite includes a set of software tools to be installed on one or more computer systems sharing access to a data storage system, such as a storage area network (SAN). The software tools running on these separate computer systems communicate and collaborate in a peer-to-peer fashion in order to coordinate loading, testing and measurement of storage throughput on the shared data storage system. The software tools further coordinate the collection, storage and presentation of results data obtained through such loading, testing and measurement of the storage throughput of the shared data storage system.

2 Claims, 7 Drawing Sheets

PATH SATURATION FOR COMPUTER STORAGE PERFORMANCE ANALYSIS

This application is a continuation of application Ser. No. 10/886,961 now U.S. Pat. No. 7,480,717, filed Jul. 8, 2004, issued Jan. 20, 2009.

BACKGROUND OF THE INVENTION

1. Technical Field

The present invention is generally directed to performance monitoring of storage area networks (SANs). More specifically, the present invention is directed to a system and method for path saturation in a storage area network so that a maximum throughput of the storage area network is determinable.

2. Description of Related Art

In today's increasingly complex organizational data environments, storage needs are exploding for a variety of reasons. The phenomenal growth is fueled by the ubiquity of specialized applications serving every area of the enterprise in a seemingly endless variety of mission critical roles, the burgeoning space requirements and complexity of modern applications, the size of records, such as still images, video, sound files, and documents containing fragments of each, and finally due to the redundancy requirements imposed by the necessity for computing systems to operate twenty four hours a day, seven days a week.

Organizations have responded to these needs by employing large direct-attached disk arrays, a variety of network attached storage devices, a rapid adoption of storage area networks (SANs) and, most recently, by deploying an additional intermediate tier of storage virtualization equipment and software. FIG. 1 illustrates an overview of a modern storage infrastructure highlighting the growing number of complex devices between the application server and the actual data on a physical storage disk. As shown in FIG. 1, the SAN 100 permits a plurality of servers 110 to access data and storage space on a plurality of physical storage devices 160. The servers 110 interface with a server SAN 120 which in turn interfaces with a virtualization server 130. The server SAN 120 provides a control point at which access requests for data and storage space on the physical storage devices 160 are controlled. The server SAN 120 is that portion of the overall storage infrastructure that provides direct connectivity to the application servers and database servers. Where storage virtualization is used, the server SAN 120 is that portion of the overall storage infrastructure between the servers and the storage virtualization equipment. The physical storage devices 160 are accessed via the storage servers 150 which control access to their individual stable of storage devices 160. The storage servers 150 are accessed via the storage SAN 140 which controls routing of access requests to the various storage servers 150.

The server SAN 120 accesses the storage SAN 140 via the virtualization server 130. The virtualization server 130 provides address translation and mapping such that the requests from the servers 110 appear, from the viewpoint of the storage SAN 140, to be from a single server and that the physical devices 160 appear, from the viewpoint of the servers 160, to be a single physical device, or appear to be a uniform series of physical devices. This virtualization aids in decoupling the servers 110 from the physical storage devices 160 so that servers 110 may be remotely located from the physical storage devices 160. More importantly, this virtualization aids in decoupling the servers 110 from the physical storage devices 160 so that the operation and use of servers 110 can be independent of the selection and management of the physical storage devices 160.

Still in early childhood, SANs provide a high-speed connection between servers and disk/tape storage resources. SANs permit any server-based resources to access common storage resources. SANs eliminate the traditional dedicated connection between a server and storage, along with the concept that the server "owns and manages" the storage devices. The SAN introduces the flexibility of networking to enable one server or many heterogeneous servers to share a common storage utility which may comprise many storage devices. In so doing, the SAN is unencumbered by geographical proximity and instead relies upon persistent communication links. SANs exist separately from previously existing inter-server data networks, e.g., local area networks (LANs) and wide area networks (WANs) because they provide a different kind of data transport. While LANs and WANs focus on communications between applications and between applications and users, SANs provide a high-speed infrastructure focused on large transfers between storage and server hardware. In summary, a SAN changes the server-centric model of the typical open systems information infrastructure and replaces it with a data-centric infrastructure.

Recent work with regard to SANs is primarily focused on improving storage management and does not focus on storage performance. That is, an organization deploying a SAN will experience a number of important uncertainties about storage performance and the impact of storage performance on application performance. Most particularly, an organization deploying new storage equipment or making major modifications or expansions of a storage infrastructure cannot tell if it can expect to be experiencing application performance problems due to weakness in the design of the storage infrastructure, selection of the wrong storage components, or a misconfiguration of storage components.

Methods exist in traditional communication networks to identify bottlenecks and slowdowns in paths from Ethernet cards through switches, hubs and routers. These techniques identify weak points in the network so that appropriate corrective action may be taken. However, by contrast, the SAN has to-date only simple tools to identify an amount of traffic through switches. Interestingly, no method for end-to-end traffic flow analysis and monitoring from processor to physical storage device and back to the processor exists.

SUMMARY OF THE INVENTION

The present invention provides a system and method for path saturation in a storage area network so that the throughput of the storage area network may be determined. The system and method includes a software utility suite that uses either a system administration scripting language, e.g., Perl or Korn shell, or by compiled or machine language software. The software utility suite includes a set of software tools to be installed on one or more computer systems sharing access to a data storage system, such as a storage area network (SAN). The software tools running on these separate computer systems communicate and collaborate in a peer-to-peer fashion in order to coordinate loading, testing and measurement of storage throughput on the shared data storage system. The software tools further coordinate the collection, storage and presentation of results data obtained through such loading, testing and measurement of the storage throughput of the shared data storage system.

Once installed and activated, the system of the present invention initializes tasks by first identifying all resources in each tier of the shared data storage system. This may involve identifying adapters, paths, storage systems, logical units, physical disks, etc. Then for each tier, an amount of resources and storage space needed to perform the operations of the present invention are allocated. The system allocates specific memory and disk space resources in order to facilitate different types of load tests.

Having identified the resources in each tier and allocated the required resources and storage space, the system of the present invention generates different kinds of high traffic loads through the appropriate resources and measures the actual throughput achieved. The system generates different levels of calibrated data rates in order to validate that the entire storage infrastructure, as well as individual components, can support different levels of loading. The system continues to generate increasing levels of calibrated data rates until it is determined that the maximum sustainable data rate for the entire storage infrastructure and the individual storage components has been reached. This information, along with the various measurements generated during the various loadings of the shared data storage system, may then be output to a user workstation for presentation of reports and graphs identifying the performance of the shared data storage system.

A number of different throughput tests are available for exercising the storage infrastructure. These include single channel specific tests, large and small block data read and write tests, multichannel multi-function tests used to determine general and maximum throughput levels in production workloads, multichannel multifunction tests used to identify and adjust bottlenecks in production workloads, and the like. Various test cases may be utilized in order to exercise real-world performance loads. For example, tests cases may include small block read and write tests to measure throughput to caches, large block read and write tests to measure throughput through or around cache to actual disk spindles, various data access patterns to simulate representative usage of storage by typical production application usage, and customized test cases to generate tailored data access patterns and sequences for specific sized data objects, in order to model unique customer application storage access activities.

In general, most load tests are an exercise to move a specific amount of a certain kind of data through one or more storage components or storage interfaces, and to determine whether the selected components can handle the specified amount of data in a specific time. Such load testing indicates whether selected storage components can handle data rates measured in gigabytes per second, terabytes per second, exabytes per second, and so forth. Most load tests are saturation tests, or tests to determine what is the largest possible data rate for specific components for certain kinds of data. Different kinds of data include large file data, small file data, mixed file size data, etc. Some tests are response time tests, where the time in seconds required to serve a particular request is measured. For example, a background data load of 150 large object writes per second may be initiated, and then once a minute, a small data object read transaction may be generated, where the time to complete the read transaction is measured in tenths of a second.

Test results may be collected, collated, displayed, graphed and may be presented to a user to provide numerous pieces of information critical to application performance and to storage infrastructure design, evaluation and configuration. Outputs of the tests described would illustrate whether a particular server SAN adapter could be fully loaded, which combinations of server SAN adapters could be fully loaded, with what kinds of data traffic, and under what conditions. Outputs of the described tests may show the scenarios under which the SAN fabric equipment, e.g. SAN switches and hubs, could be fully loaded, under what circumstances disk server systems would become fully loaded, etc. From this information, an understanding of the circumstances at which storage performance would become impacted on the actual customer infrastructure, and at which point application performance would become impacted, is obtained. In this way, appropriate corrective action may be taken to ensure proper operation of the shared data storage system such that performance goals are achieved.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a system and method for performing path saturation in a shared data storage system, such as a storage area network (SAN), to determining the throughput of the storage area network under various loading conditions. The present invention, in a preferred embodiment, includes a suite of software tools that are installed on one or more computing devices. This suite of software tools perform functions to identify the resources of the shared data storage system, generate a load on one or more components of the shared data storage system, and obtain a response measurement to the generated load. These measurements may be used to determine what other loading should be tested with regard to the one or more components and may be used to generate reports, graphs, and other output useable by a user to determine the performance of the shared data storage system and possible areas of the shared data storage system that should be modified to achieve a desired performance of the shared data storage system.

Figure 2:
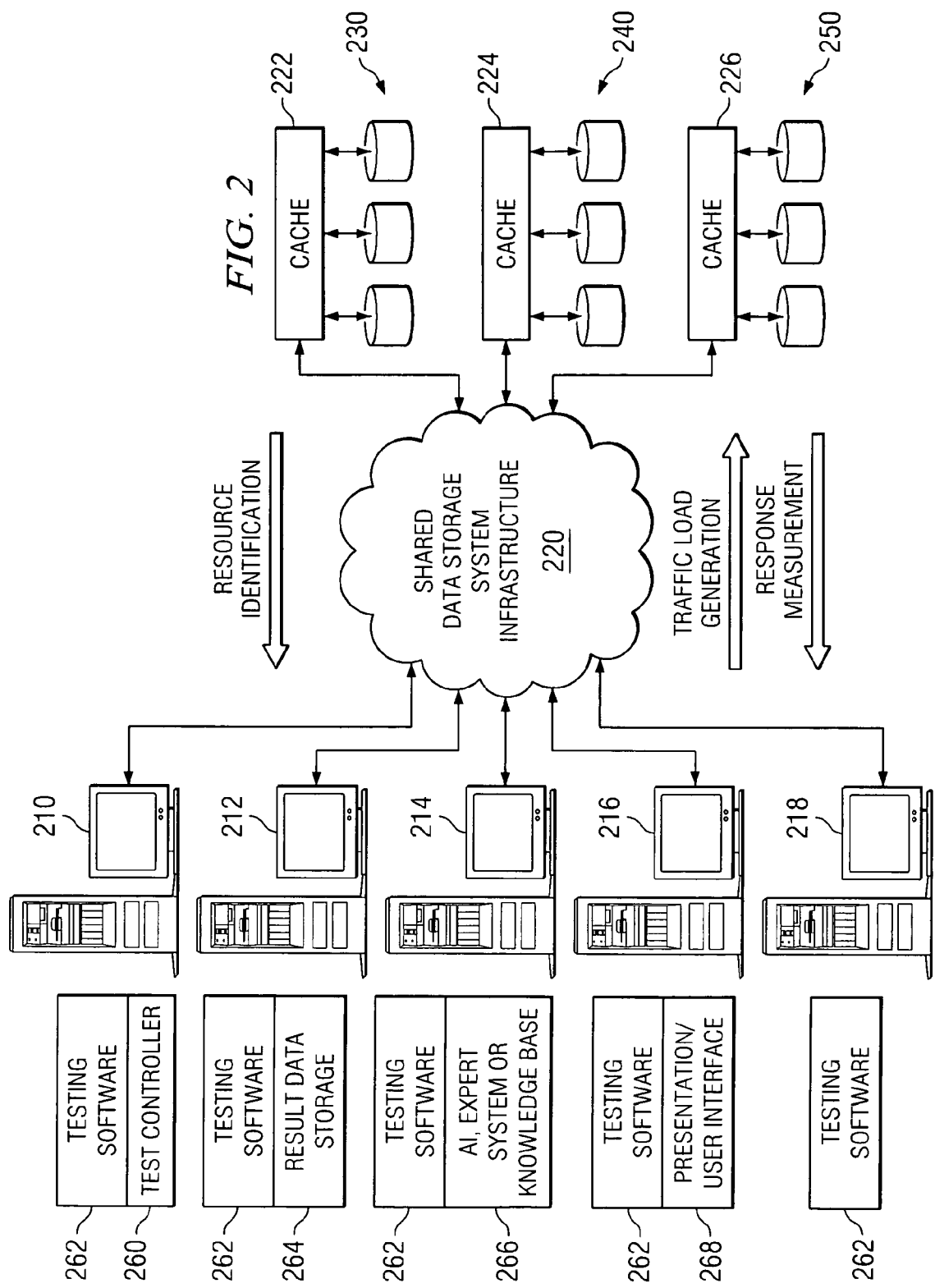
FIG. 2 is an exemplary diagram illustrating the deployment of the software suite of the present invention on a plurality of server computing devices for use in path saturation and throughput testing of a storage area network, in accordance with one exemplary embodiment of the present invention.

FIG. 2 is an exemplary diagram illustrating the deployment of the software suite of the present invention on a plurality of server computing devices for use in path saturation and throughput testing of a storage area network, in accordance with one exemplary embodiment of the present invention. As shown in FIG. 2, a plurality of server computing devices 210-218 are provided and are coupled to the shared data storage system infrastructure 220 in a manner generally known in the art. These servers 210-218, in one exemplary embodiment, represent existing business servers upon which testing software has been installed. However, these servers 210-218 may be special-purpose or dedicated servers installed specifically for testing the storage infrastructure. Additionally, these servers 210-218 may be a mix of business servers and dedicated test servers.

Figure 1:
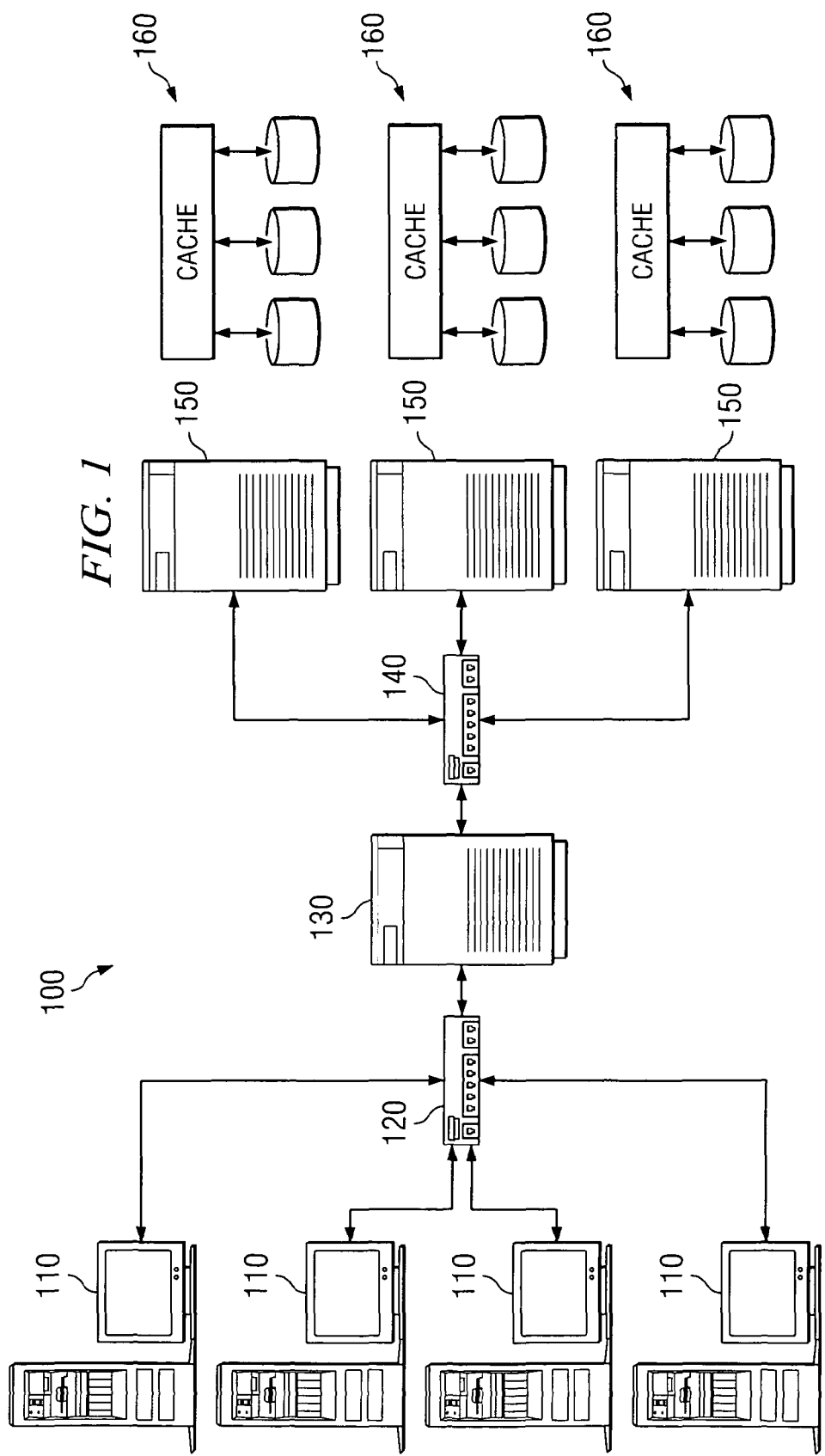
FIG. 1 is a diagram of a modern virtualized storage area network.

The plurality of server computing devices 210-218 access physical storage devices 230-250 via the storage infrastructure 220 which may include, as shown in FIG. 1, a server storage area network (SAN), a virtualization server, a storage SAN, and other infrastructure components. Caches 222-226 are provided for caching data written to and read from the physical storage devices 230-250 prior to or immediately after the data is written to or read from the physical storage devices 230-250.

Software components 260-268 of a path saturation testing system, according to one exemplary embodiment of the present invention, are distributed across the plurality of servers 210-218. Although in a preferred embodiment of the present invention the software components 260-268 are distributed across a plurality of server computing devices, the present invention is not limited to such an embodiment. Rather, the software components 260-268 may be resident on a single computing device.

The software components 260-268 include a test controller component 260, testing software component 262, result data storage interface component 264, artificial intelligence, expert system or knowledge base component 266, and presentation/user interface component 268. Although these are the specific components illustrated in FIG. 2 and described hereafter, other software components may be included in the present invention either in replacement of, or in addition to, the software components illustrated without departing from the spirit and scope of the present invention.

The test controller component 260 controls the overall operation of the distributed software components and orchestrates their operation to test the throughput of the shared data storage system and compile the results of these tests. The test controller 260 obtains resource information for the various resources present in the shared data storage system and instructs the server computing devices 210-218 which tests to perform and the targets of these tests.

The testing software component 262 is replicated on a plurality of server computing devices 210-218 and actually performs the tests instructed by the test controller 260. These tests involve generating loads on the various resources of the shared data storage system and the receiving back responses from these various components. The testing software component 262 is replicated on a plurality of server computing devices 210-218 in order to better simulate the loads that may be experienced due to requests from a plurality of sources being processed. Metrics regarding the performance of the shared data storage system components in handling the loads are measured based on the responses received. This information is stored on one or more of the server computing devices and is accessible via the result data storage interface 264.

The artificial intelligence, expert system or knowledge base component 266 is used to analyze the result data obtained by testing the shared data storage system and identify problems within the shared data storage system. Such problems may include, for example, bottlenecks, heavily loaded adapters, misconfigured adapters, inadvisable SAN topology, unbalanced loading, and the like.

The result data obtained from the tests, as well as information generated by the artificial intelligence, expert system or knowledge base 266, may be provided to a user via the presentation/interface component 268. The presentation/interface component may generate reports, graphs, tables, etc. for visually and/or audibly presenting information to a user regarding the performance of the shared data storage system for various loadings as well as identifying the maximum throughput of the shared data storage system based on the maximum throughputs of the shared data storage system components. In addition, these reports, graphs, tables, etc. may identify individual areas or components of the shared data storage system architecture where problems, e.g., bottlenecks or slowdowns in throughput, are identified based on the results of the tests. In this way, the user may be directed to areas of the shared data storage system architecture that need reconfiguring.

Because the present invention operates on the actual configuration of the shared data storage network as it is used when deployed, the present invention permits an organization to test and demonstrate the actual maximum achievable throughput in that organization's exact real-world storage configuration. Furthermore, the present invention enables an organization to validate that their shared data storage system is properly configured for expected throughput. In other words, bottlenecks due to incomplete or improper configuration of the storage infrastructure can be identified and highlighted as an infrastructure exercise before applications are brought on-line and become performance bound for undetermined reasons.

Because the present invention provides a mechanism for end-to-end path saturation in a shared data storage system, the systems engineer or administrator can identify bottlenecks or slowdowns in his/her shared data storage. In addition, the systems engineer or administrator can eliminate or mitigate the identified weak points and increase the overall effectiveness of the organization's applications and architectural investment.

Figure 3:
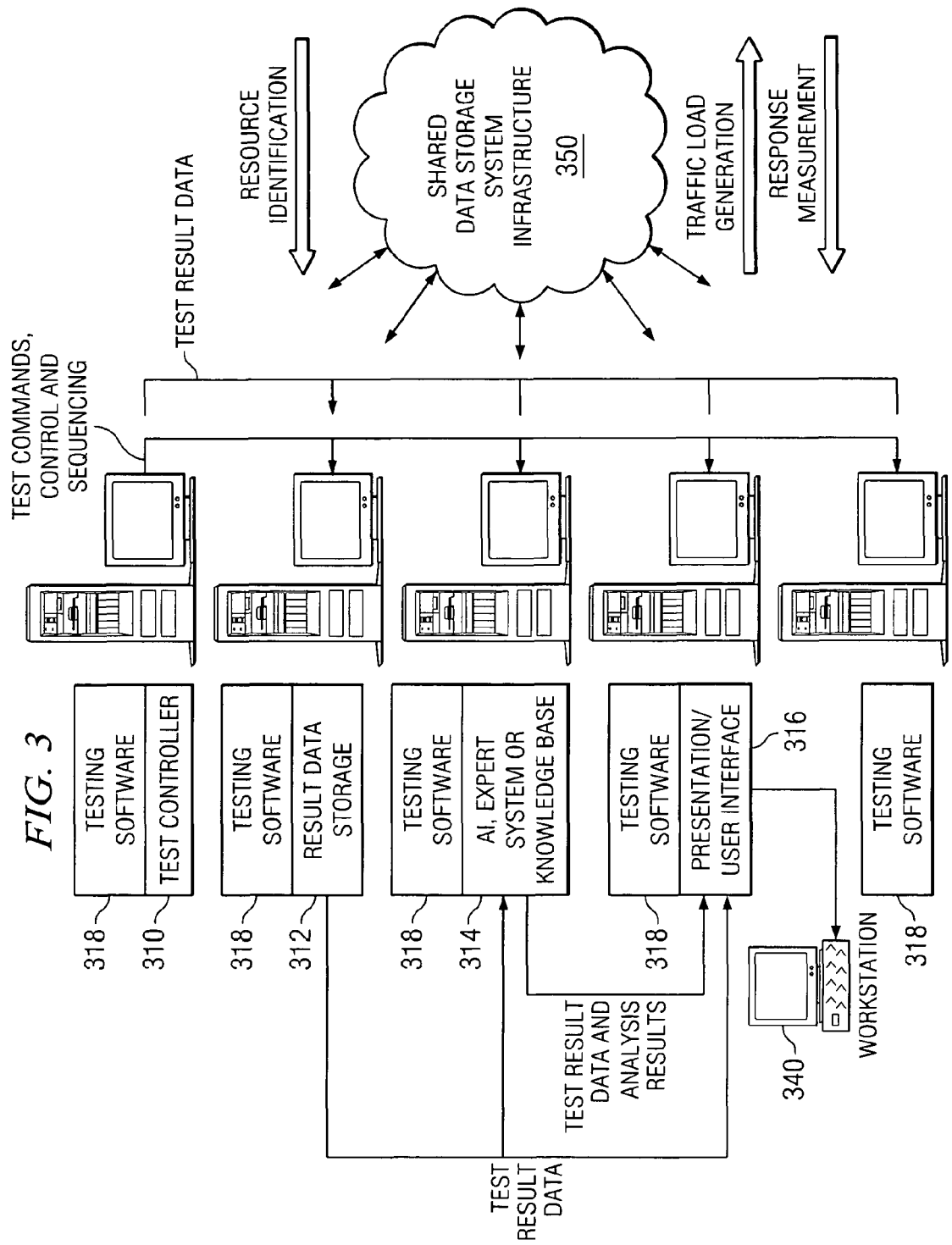
FIG. 3 is an exemplary diagram illustrating communication between the various software components of the software suite according to one exemplary embodiment of the present invention.

FIG. 3 is an exemplary diagram illustrating communication between the various software components of the software suite according to one exemplary embodiment of the present invention. As shown in FIG. 3, the test controller 310 instructs the common testing software component 318 in all the participating servers to launch queries into the shared data storage system infrastructure 350 for resource information to thereby identify the various resources in the shared data storage system, e.g., adapters, physical disks, servers, logical units, etc. The test controller 310 may then allocate resources and space needed in each tier of the shared data storage system infrastructure 350 for performing the various different types of load tests. This may involve allocating memory, disk space, paths, etc. for the tests.

The test controller 310 then provides test commands, control and sequencing messages to the other components 312-318. The test controller 310 instructs each of the testing software components 318 on the servers to generate certain test loads for the shared data storage system components in the shared data storage system infrastructure 350. Each of the testing software components 318 generates different kinds of high traffic loads through the appropriate resources and measures the actual throughput achieved. Throughput of most load tests is measured in a storage unit per time, such as gigabytes per second. The results of response time tests are measured in seconds. The testing software 318 generates different levels of calibrated data rates in order to validate that the entire shared data storage system infrastructure, as well as individual components, can support different levels of loading. Calibrated data rates means that the testing software generates loads at specific rates and measure the results. For example, each server may initiate a series of data write requests at 10 requests per second, 100 requests per second, 1000 requests per second, etc, and capture the speed at which the storage systems acknowledge completion of these transactions. The testing software may then examine the results to determine which storage paths can successfully provide the various requested data rates.

The testing software component 318 continues to generate increasing levels of calibrated data rates until it is determined what is the maximum sustainable data rate for the entire shared data storage system infrastructure 350 and the individual components. The maximum sustainable data rate is determined when an increasing rate of data generation does not cause a corresponding increase in transactions completed. A decrease in response rates may accompany attempting to drive the data rate past the maximum sustainable rate. In general, the overall testing consists of individual testing performed singly and serially on each storage interface in the accessible servers, followed by parallel tests on groups of interfaces and on all available interfaces. Based on these test loads, the testing software components 318 receive results of the processing of their test loads from the shared data storage system infrastructure 350 and provide these results to the result data storage component 312.

The artificial intelligence, expert system or knowledge base component 314 analyzes the result data in the result data storage 312 and generates reports, graphs, tables, or other informational data structures for presentation to a user. This information, along with the results of the tests, is passed to the presentation/user interface component 316. The presentation/user interface component 316 provides a user interface through which the results of the tests and the analysis performed by the artificial intelligence, expert system or knowledge base component 314 are presented to a user workstation 340. The user may then review the results and analysis and determine where configuration modifications may be necessary in the shared data storage system infrastructure 350.

As mentioned above, the testing software components 318 generate test loads for components in the shared data storage system infrastructure 350 and measure the responses they receive from the shared data storage system infrastructure 350. These tests may take many different forms depending on the particular components of the shared data storage system infrastructure 350 that are to be tested. Examples of the tests or test loadings that may be generated include single channel specific tests, large and small block data read and write tests, multichannel multifunction tests, and the like. Other types of tests may be utilized without departing from the spirit and scope of the present invention.

Figure 4:
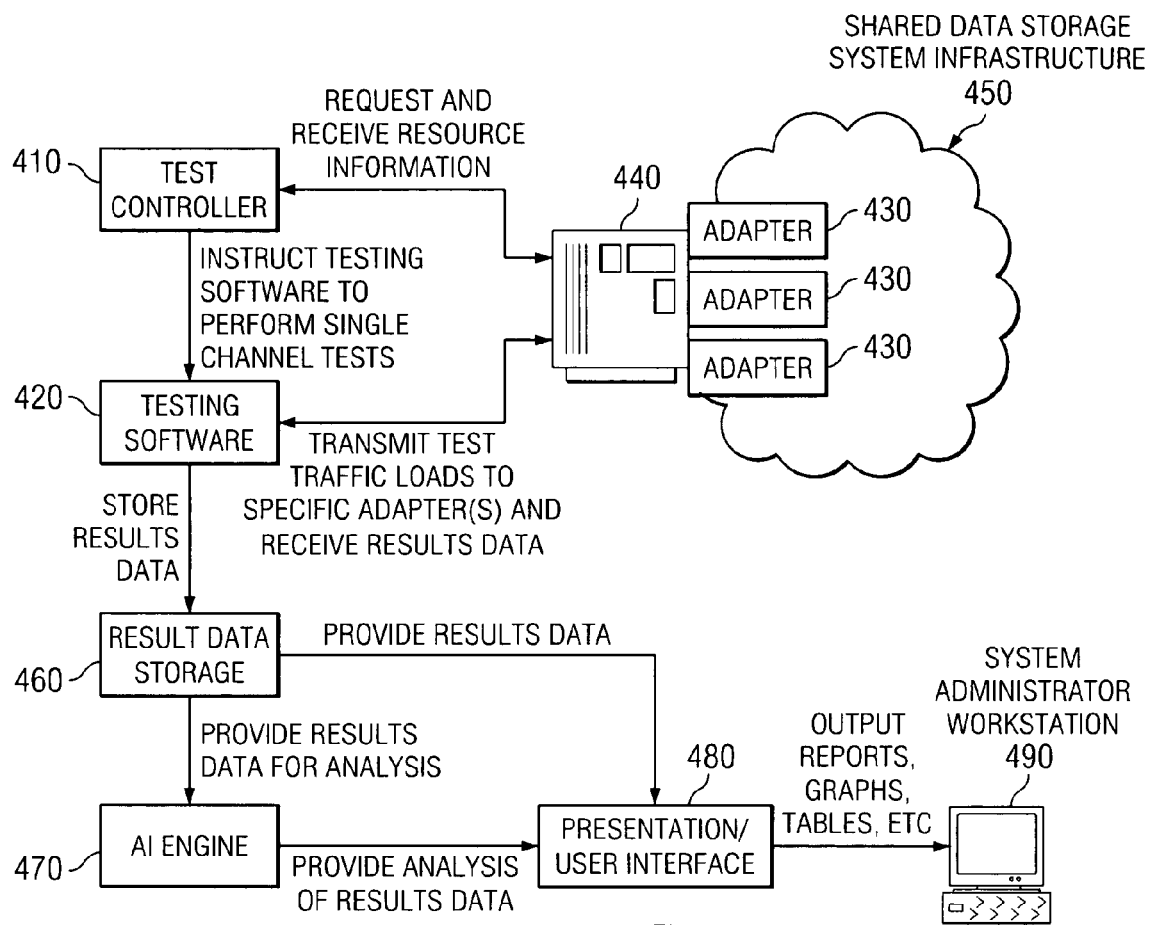
FIG. 4 is an exemplary diagram illustrating a single channel specific test performed by the system of the present invention.

FIG. 4 is an exemplary diagram illustrating a single channel specific test performed by the system of the present invention. The single channel specific tests are used to exercise specific adapters, SANs, interfaces, paths, disks, and the like. In a single channel specific test, a stair-step increase of calibrated data loads are sent individually through each of the server's fiber adapter cards to determine the maximum sustainable data rate at each directly accessible point in the shared data storage system infrastructure.

Thus, as illustrated, the test controller 410 instructs the test software components 420 to generate a series of calibrated data loads of increasing amounts and direct the calibrated data loads to a specific resource or resources, such as the adapters 430 in the server 440, in the shared data storage system infrastructure 450. The test controller 410 identifies the various resources in the shared data storage system infrastructure 450 by directly querying the controller of the shared data storage system infrastructure 450 for configuration information, and also by instructing the test software component 420 to query its local configuration information. This information is stored by the test controller 410 for use in identifying individual components of the shared data storage system infrastructure 450. This connection and topology information is also forwarded to the Result Data Storage 460. Each component in the shared data storage system is addressable by a device identifier, such as a network device address and thus, may be individually targeted for testing. The test software inventories all addressable components and schedules individual throughput tests for all individually accessible components. Early tests in the test plan may focus on individual tests executed singly and serially on each storage interface on each server. Additional tests in the test plan may focus on individual tests executed singly and serially on each physical or logical disk storage resource in the infrastructure.

During testing the various components of interest in the shared data storage system infrastructure 450, the results of these tests are stored in a results data storage 460. This results data may then be analyzed by an artificial intelligence engine 470, such as an expert system, knowledge base, neural network, or the like, to come to conclusions as to any problems that may exist in the current infrastructure architecture. For example, from the various data rates obtained through testing, the maximum sustainable data rates for each of the tested components may be identified. The maximum sustainable data rate for the entire shared data storage system may then be determined as a function of these maximum sustainable data rates, e.g., the lowest maximum sustainable data rate may be determined to be the limiting factor for the entire shared data storage system infrastructure and may be determined to be the maximum sustainable data rate for the infrastructure. Alternatively, the maximum sustainable data rate information may be analyzed to identify outlier maximum sustainable data rates, a core set of components that all have similar maximum sustainable data rates, comparing components of a same type to determined if they have similar maximum sustainable data rates and generating conclusions based on whether there are any components of this type that have maximum sustainable data rates that are divergent from the majority of other components of the same type, and the like. The number of different types of analysis that may be performed using artificial intelligence engines is too vast to recite all of the possibilities here. However, any analysis of the maximum sustainable data rate information obtained through testing of the shared data storage system infrastructure in order to identify possible problems with the infrastructure configuration is intended to be within the spirit and scope of the present invention.

The analysis performed by the artificial intelligence engine may be used to identify any problems within the shared data storage system infrastructure that need to be addressed by a system administrator. For example, if an adapter is determined to have a low maximum sustainable data rate compared to other components of a similar type in the shared data storage system, this component may be identified as a problem location. This problem location may then be reported to the system administrator via the presentation/user interface component 480. The presentation/user interface component 480 generates the graphs, reports, tables, and other visual and/or audible representations of the results of the tests and the artificial intelligence engine analysis and provides these representations to a system administrator workstation 490. In this way, configuration problems and the maximum throughput of the shared data storage system may be communicated to the system administrator for use.

Figure 5:
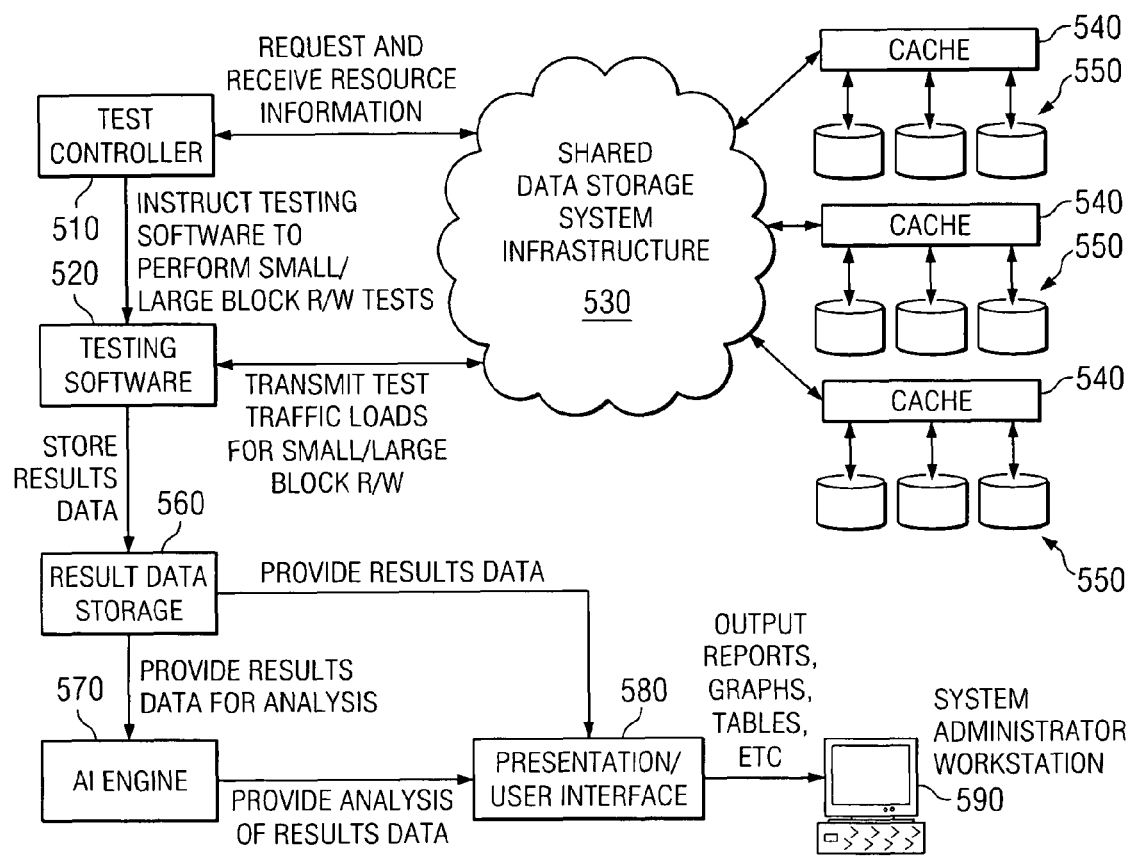
FIG. 5 is an exemplary diagram illustrating large and small block data read and write tests performed by the system of the present invention.

FIG. 5 is an exemplary diagram illustrating large and small block data read and write tests performed by the system of the present invention. The large and small block data read and write tests are used to test the throughputs generally specific to front end cache or back end disks. For example, a read of the same small amount of data from the same disk locations may be performed repeatedly. This causes the shared data storage system infrastructure to more efficiently service read requests from cache. This test allows the present invention to determine the maximum sustainable data rate from cache.

Similarly, repeatedly writing a changing data pattern in large blocks can force the shared data storage system infrastructure to move data directly to the actual disk drives. By repeatedly sending writes to the shared data storage system in which the data is a large block of data and wherein the data pattern is changing with each write, the maximum sustainable data rate for large block operations may be determined.

Thus, as shown in FIG. 5, the test controller 510 may instruct the test software components 520 to send small block data read and write requests to the physical storage devices of the shared data storage system infrastructure 530. In response, the test software components 520 may generate reads/writes to the same data locations in the physical storage devices 550. The responses from the shared data storage system infrastructure 530 are measured and stored. This information identifies the throughput of the caches 540 associated with the physical storage devices 550 in the shared data storage system infrastructure since data that is more frequently accessed is stored in the caches 540 and thus, the throughput associated with writing to, and reading from, the shared data storage system infrastructure 530 in this manner is primarily dependent upon the responsiveness of the caches 540.

Similarly, the test controller 510 may instruct the test software components 520 to send large block reads and writes having varying data patterns to the shared data storage system infrastructure 530. The multiple large block reads and writes generated by the test software components 520 will either pass through or around the caches 540 and be handled directly by the physical storage devices 550 since they have different data patterns and thus, access storage locations that will typically not be in cache 540. In this way, the response from the shared data storage system infrastructure 530 is indicative of the throughput of the actual disk heads and spindles.

The throughput information, e.g., the maximum sustainable data rates, of the caches 540 and physical storage devices 550 may be analyzed in a similar manner as discussed above with regard to the single channel tests. That is, the results data are provided to the Result Data Storage 560 by the various test software components 520. Then, the artificial intelligence engine 570 may analyze the results data obtained from these small and large block read/write tests to determine if any of the caches 540 and/or physical storage devices 550 are potential bottlenecks or slowdown locations warranting further attention by the system administrator. The results of this analysis may then be provided, along with the test result data, to the system administrator via the presentation/user interface 580 and system administrator workstation 590 for his/her use in identifying shared data storage system infrastructure configuration problems, if any.

Figure 6:
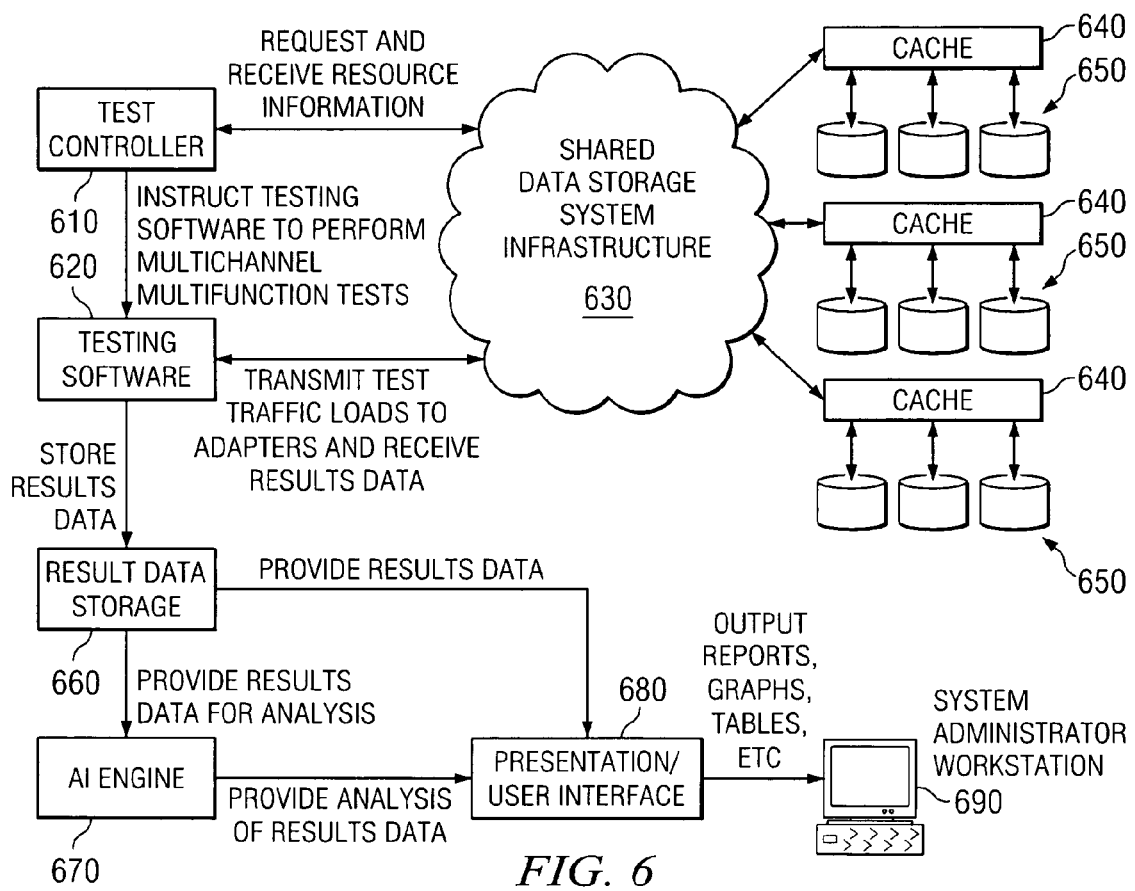
FIG. 6 is an exemplary diagram illustrating multichannel multifunction tests performed by the system of the present invention.

FIG. 6 is an exemplary diagram illustrating multichannel multifunction tests performed by the system of the present invention. The multichannel multifunction tests are essentially a combination of multiple, parallel instances of the above described tests.

As shown in FIG. 6, the test controller 610 may instruct the test software components 620 to perform multichannel multifunction testing by sending various data read and write requests to the physical storage devices of the shared data storage system infrastructure 630. In response, the test software components 620 may generate reads/writes to a plurality of data locations in the physical storage devices 650. The responses from the shared data storage system infrastructure 630 are measured and stored. This information identifies the throughput of the shared data storage system infrastructure 630 as a whole. The various data read and write requests may take the form of the small and large read/write requests discussed previously with regard to the other tests that may be performed by the present invention.

The throughput information, e.g., the maximum sustainable data rates, of the caches 640 and physical storage devices 650 may be analyzed in a similar manner as discussed above with regard to the single channel tests. That is, the results data are provided to the Result Data Storage 660 by the various test software components 620. Then, the artificial intelligence engine 670 may analyze the results data obtained from these small and large block read/write tests to determine if any of the caches 640 and/or physical storage devices 650 are potential bottlenecks or slowdown locations warranting further attention by the system administrator. The results of this analysis may then be provided, along with the test result data, to the system administrator via the presentation/user interface 680 and system administrator workstation 690 for his/her use in identifying shared data storage system infrastructure configuration problems, if any.

The various tests described above with regard to FIGS. 4-6 are intended to test the throughput of various components of the shared data storage system and thereby, generate results data which can be used to identify problems in the shared data storage system infrastructure configuration. While the above analysis has been described with regard to each test individually, it should also be appreciated that the analysis performed by the artificial intelligence engine may be applied to all of the result data obtained from each of the tests or subsets of the tests, to discern other relationships between the performance of components in the shared data storage system infrastructure. In this way, portions of the shared data storage system, or the entire shared data storage system as a whole, may be analyzed to determine maximum achievable throughput and to isolate configuration problems.

Figure 7:
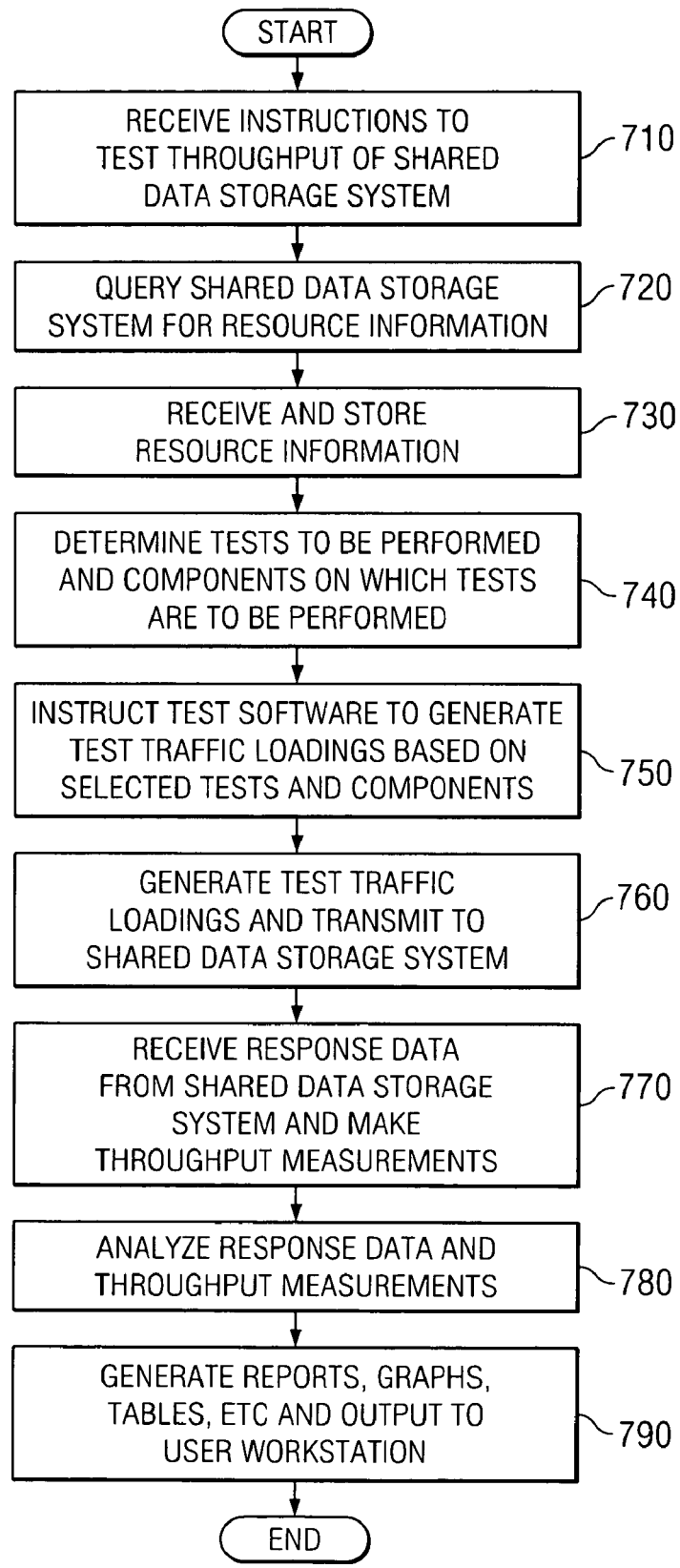
FIG. 7 is a flowchart outlining an exemplary operation of the present invention.

FIG. 7 is a flowchart outlining an exemplary operation of the present invention when testing the throughput of a shared data storage system, such as a storage area network (SAN). It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems which perform the specified functions or steps, or by combinations of special purpose hardware and computer instructions.

As shown in FIG. 7 the operation starts by receiving instructions to test the throughput of the shared data storage system (step 710). These instructions may include a designation of the portion of the shared data storage system that is to be tested, the particular components of the shared data storage system that are of interest, the types of tests to be performed, and/or other parameters. These instructions may be provided automatically, such as on a timed basis, or manually by a system administrator or other user.

In response to receiving the instructions to test the shared data storage system, the test controller queries the shared data storage system for resource information (step 720). The obtaining of resource information from a shared data storage system is generally known in the art. For example, various scripts may be generated that list all the resources on a system and the properties of each resource. This resource information may include, for example, what kinds of adapter cards are in which slots of the shared data storage system, what disks are attached to which adapter cards, which vendor's storage hardware is attached, what the paths to this hardware are, what kind of pathing capabilities are in place, etc.

Resource information is then received and stored for later use in generating test loadings for testing the throughput of the shared data storage system (step 730). Thereafter, the test controller determines what tests are to be performed and on which components of the shared data storage system (step 740). The test controller then instructs the test software components to generate appropriate test loadings based on the selected tests and the identified components (step 750). The test software components generate the test loadings and transmit them to the share data storage system (step 760). Responses to the test loadings are received from the shared data storage system and throughput measurements are made (step 770). This information is stored for later analysis by the artificial intelligence engine.

At some time later, the stored response data and throughput measurement information are analyzed to determine maximum sustainable throughputs of the various components of the shared data storage system, the portion of the shared data storage system of interest, and/or the shared data storage system as a whole (step 780). In addition, the analysis may involve identifying bottleneck components or slowdown components of the shared data storage system and throughput problems. This information, along with the response data and analysis information, may then be presented to a system administrator or other user via a workstation as various reports, graphs, tables, etc. generated by the presentation/user interface (step 790). The operation then ends.

Thus, as discussed above, the present invention provides a mechanism by which paths within the shared data storage system may be saturated, i.e. paths within the shared data storage system may be subjected to high calibrated traffic loads, so as to measure the maximum sustainable throughput of the shared data storage system, e.g. the SAN. Reports, graphs, etc., may be generated that identify the problem locations with in the shared data storage system infrastructure as well as maximum sustainable throughputs of the various components of the shared data storage system, portions of the shared data storage system, and/or the shared data storage system as a whole.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A non-transitory computer-readable storage medium storing instructions identifying a maximum throughput of one or more components of a storage area network, the instructions comprising:

first instructions distributing testing software to a plurality of server computing devices coupled to the storage area network;

second instructions instructing the distributed testing software on the plurality of servers to generate and transmit portions of one or more test loadings to the one or more components of the storage area network operating in actual configuration when deployed, wherein the one or more test loadings includes at least one of single channel specific test loadings, large block data read and write test loadings, small block data read and write test loadings, and multichannel multifunction test loadings;

third instructions generating increasing levels of calibrated data rates for the storage area network;

fourth instructions transmitting the one or more test loadings to the one or more components of the storage area network;

fifth instructions measuring a response from the one or more components of the storage area network to thereby generate response data, wherein each server computing device in the plurality of server computing devices receives the response data corresponding to a portion of the one or more test loadings the each server computing device respectively transmitted;

sixth instructions compiling the response data from all of the plurality of server computing devices coupled to the storage area network, wherein one server computing device in the plurality of server computing devices compiles the response data;

seventh instructions providing the response data from the one server computing device to another server computing device in the plurality of server computing devices, wherein the another server computing device has an artificial intelligence engine to analyze the response data and to generate results of the analysis;

eighth instructions analyzing the response data to identify the maximum throughput of the one or more components of the storage area network, wherein an analysis is formed;

ninth instructions for determining an actual maximum sustainable data rate for the one or more components of the storage area network;

tenth instructions providing results of the analysis to a presentation user interface engine present on one of the plurality of server computing devices;

eleventh instructions presenting the results to a user via the presentation user interface engine, wherein the results include information identifying data rate characteristics of the storage area network as a whole and individual components within the storage area network;

twelfth instructions identifying resources for each tier of the storage area network; and thirteenth instructions determining, for the each tier, an amount of the resources and a storage space needed to generate the one or more test loadings for the storage area network.

2. A data processing system identifying a maximum throughput of one or more components of a storage area network comprising:

a processor; a memory, the memory storing executable instructions distributing testing software to a plurality of server computing devices coupled to the storage area network;

means for instructing the distributed testing software on the plurality of servers to generate and transmit portions of one or more test loadings to the one or more components of the storage area network;

means for operating in actual configuration when deployed, wherein the one or more test loadings includes at least one of single channel specific test loadings, large block data read and write test loadings, small block data read and write test loadings, and multichannel multifunction test loadings;

means for generating increasing levels of calibrated data rates for the storage area network;

means for transmitting the one or more test loadings to the one or more components of the storage area network;

means for measuring a response from the one or more components of the storage area network to thereby generate response data, wherein each server computing device in the plurality of server computing devices receives the response data corresponding to a portion of the one or more test loadings the each server computing device respectively transmitted;

means for compiling the response data from all of the plurality of server computing devices coupled to the storage area network, wherein one server computing device in the plurality of server computing devices compiles the response data;

means for providing the response data from the one server computing device to another server computing device in the plurality of server computing devices, wherein the another server computing device has an artificial intelligence engine to analyze the response data and to generate results of the analysis;

means for analyzing the response data to identify the maximum throughput of the one or more components of the storage area network, wherein an analysis is formed;

means for determining an actual maximum sustainable data rate for the one or more components of the storage area network;

means for providing results of the analysis to a presentation user interface engine present on one of the plurality of server computing devices;

means for presenting the results to a user via the presentation user interface engine, wherein the results include information identifying data rate characteristics of the storage area network as a whole and individual components within the storage area network;

means for identifying resources for each tier of the storage area network; and means for determining, for the each tier, an amount of the resources and a storage space needed to generate the one or more test loadings for the storage area network.

* * * * *